(12) United States Patent
Wögerbauer et al.

(10) Patent No.: US 10,365,092 B2
(45) Date of Patent: *Jul. 30, 2019

(54) ELECTRONIC ANGLE MEASURING DEVICE FOR A BENDING MACHINE FOR MEASURING THE BENDING ANGLE BETWEEN THE LEGS OF A METAL SHEET

(71) Applicant: KEBA AG, Linz (AT)

(72) Inventors: Johann Wögerbauer, Linz (AT); Andreas Wögerbauer, Linz (AT)

(73) Assignee: KEBA AG, Linz (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/577,759

(22) PCT Filed: May 25, 2016

(86) PCT No.: PCT/AT2016/050164
§ 371 (c)(1),
(2) Date: Nov. 28, 2017

(87) PCT Pub. No.: WO2016/187639
PCT Pub. Date: Dec. 1, 2016

(65) Prior Publication Data
US 2018/0172438 A1 Jun. 21, 2018

(30) Foreign Application Priority Data
May 28, 2015 (AT) ...................................... 334/2015

(51) Int. Cl.
*B21D 5/00* (2006.01)
*B21D 5/02* (2006.01)
(Continued)

(52) U.S. Cl.
CPC .............. *G01B 11/26* (2013.01); *B21C 51/00* (2013.01); *B21D 5/006* (2013.01); *B21D 5/02* (2013.01);
(Continued)

(58) Field of Classification Search
CPC ................................ B21D 5/006; G01B 21/22
See application file for complete search history.

(56) References Cited

U.S. PATENT DOCUMENTS 4,564,765 A * 1/1986 Blaich ...................... B21D 5/02
250/559.37
5,148,693 A * 9/1992 Sartorio ............... B21D 5/0209
72/18.1
(Continued)

FOREIGN PATENT DOCUMENTS

| DE | 4312565 A1 | 10/1994 |
| JP | 2002-059217 A | 2/2002 |
| WO | 2004/090467 A1 | 10/2004 |

OTHER PUBLICATIONS

Espacenet English-language Abstract for JP2002-059217 A published Feb. 26, 2002.
(Continued)

*Primary Examiner* — Shawn Decenzo
(74) *Attorney, Agent, or Firm* — Tiajoloff & Kelly LLP

(57) ABSTRACT

An electronic angle measuring device for measuring the bending angle between the legs (4) of a metal sheet (5) having a sensor element (7) which delivers angle-equivalent signals in a contact-free manner to a signal processing device (9) comprising a microprocessor and a memory unit which is connected to a digital display (10) is described. In order to create advantageous measurement conditions, it is proposed that a sensor element (7) which deflects a laser beam through a rotating mirror onto the two legs (4) of the metal sheet (5) and which forms a measured value from the
(Continued)

reflection beam received in the emission direction, the signal processing device (9) with the microprocessor and the memory unit as well as the digital display (10) form an angle measuring device (6) which can be fastened to an upper tool (1) of a bending machine and which can be used as a manual measuring device (6).

10 Claims, 2 Drawing Sheets

(51) Int. Cl.
*B21C 51/00* (2006.01)
*G01B 11/26* (2006.01)
*G01B 21/04* (2006.01)
*G01B 21/22* (2006.01)

(52) U.S. Cl.
CPC ......... *B21D 5/0272* (2013.01); *G01B 21/047* (2013.01); *G01B 21/22* (2013.01); *G01B 2210/58* (2013.01)

(56) References Cited

U.S. PATENT DOCUMENTS

| | | | | |
|---|---|---|---|---|
| 5,291,264 A * | 3/1994 | Longa | ................ | G01B 11/2755 356/139.09 |
| 5,488,470 A * | 1/1996 | Ooenoki | ............. | B21D 5/0209 356/138 |
| 5,531,087 A * | 7/1996 | Kitabayashi | ............. | B21D 5/02 72/31.01 |
| 5,864,391 A * | 1/1999 | Hosokawa | ........... | G01S 7/4817 356/4.01 |
| 6,268,912 B1 * | 7/2001 | Brinkman | ................ | B21D 5/02 356/138 |
| 6,386,008 B1 * | 5/2002 | Virtanen | ................. | B21D 5/02 72/19.8 |
| 6,727,986 B1 * | 4/2004 | Serruys | .................... | B21D 5/02 356/139.03 |
| 7,316,077 B2 | 1/2008 | Fuge et al. | | |
| 7,639,346 B2 | 12/2009 | Booker, Jr. | | |
| 9,134,339 B2 | 9/2015 | Becker et al. | | |
| 2003/0160974 A1 * | 8/2003 | Demeyere | .............. | G01B 11/08 356/635 |
| 2007/0058155 A1 | 3/2007 | Booker, Jr. | | |
| 2007/0068024 A1 | 3/2007 | Fuge et al. | | |
| 2013/0176572 A1 * | 7/2013 | Lim | ......................... | G01B 9/02 356/479 |
| 2013/0181983 A1 * | 7/2013 | Kitamura | ............... | G01B 11/24 345/419 |
| 2013/0289760 A1 * | 10/2013 | Angerer | .................... | B21D 5/00 700/165 |
| 2013/0298624 A1 * | 11/2013 | Sperrer | .................... | B21D 5/00 72/2 |
| 2015/0006074 A1 * | 1/2015 | Le Scouarnec | ....... | G01C 21/165 701/468 |
| 2015/0055204 A1 * | 2/2015 | Ichii | .................... | G02B 26/0841 359/214.1 |
| 2015/0085301 A1 | 3/2015 | Becker et al. | | |
| 2015/0160342 A1 * | 6/2015 | Zweigle | ............... | G09B 29/004 356/5.01 |
| 2015/0212653 A1 * | 7/2015 | Cable | .................... | G06F 3/0423 345/175 |
| 2015/0241208 A1 * | 8/2015 | Lichtenberg | ........... | B21D 5/006 72/31.1 |
| 2016/0040973 A1 * | 2/2016 | Gesuita | .................... | G01B 5/24 33/534 |
| 2016/0245918 A1 | 8/2016 | Becker et al. | | |

OTHER PUBLICATIONS

Espacenet English-language Abstract for DE 4312565 A1 published Oct. 20, 1994.

* cited by examiner

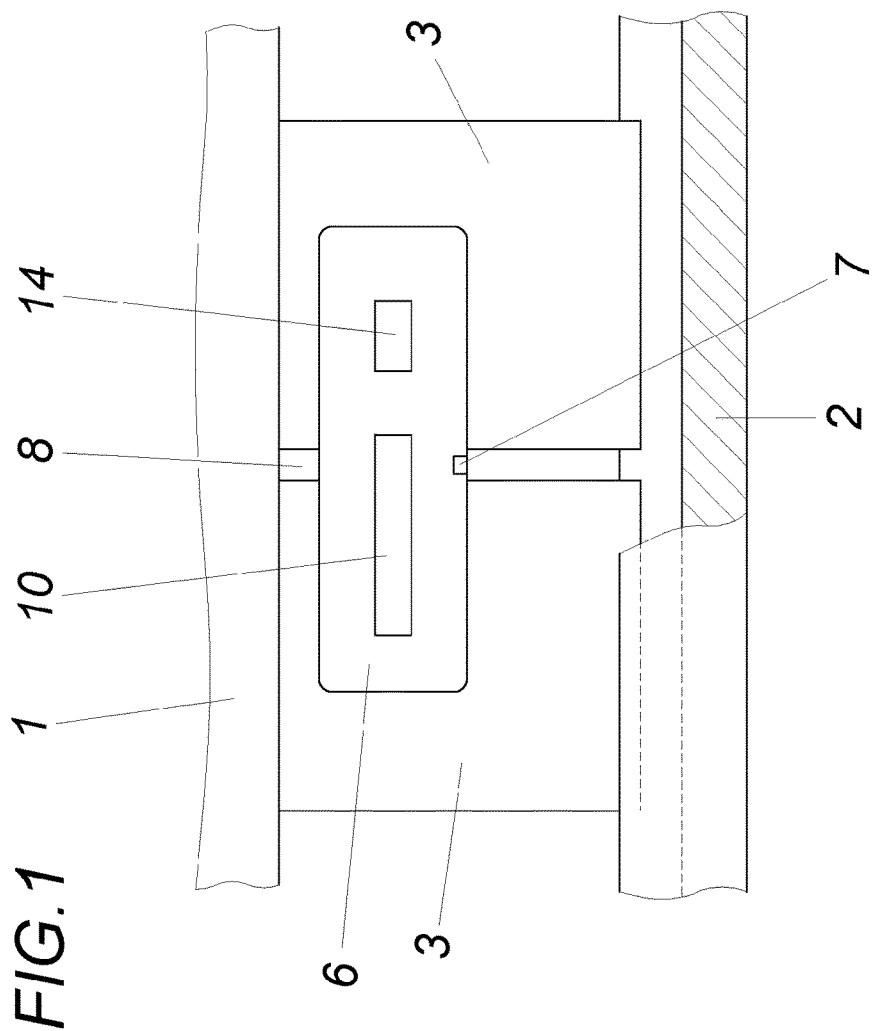
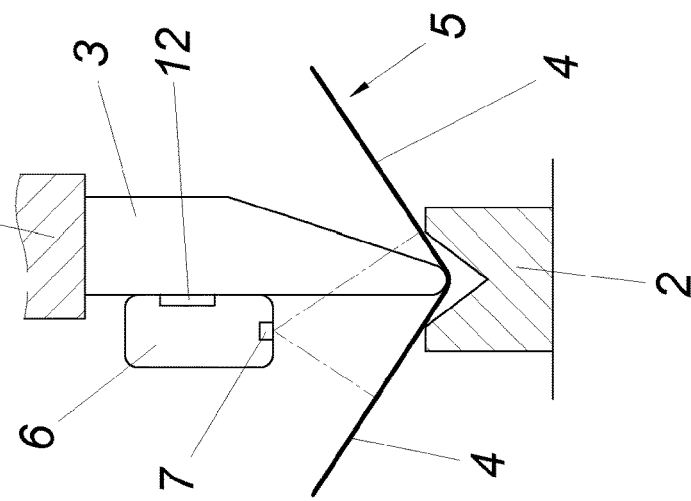

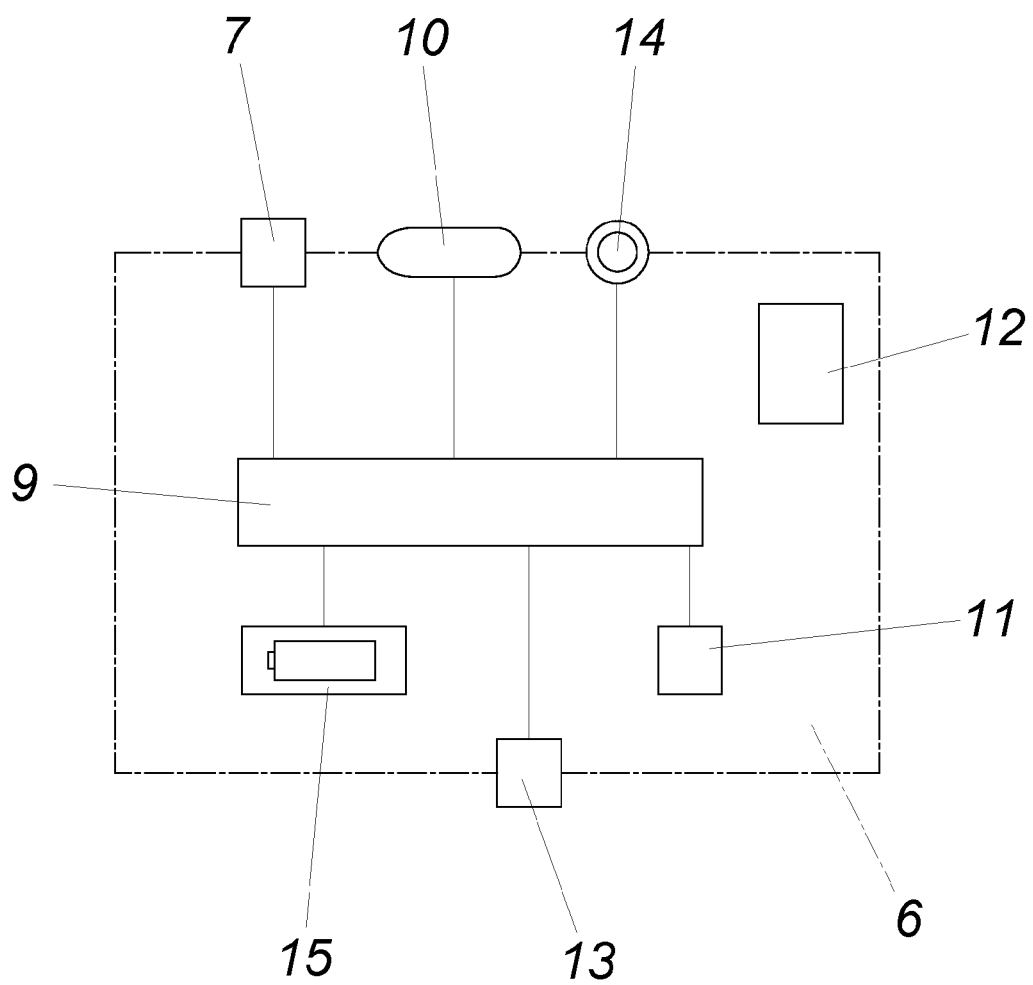

ELECTRONIC ANGLE MEASURING DEVICE FOR A BENDING MACHINE FOR MEASURING THE BENDING ANGLE BETWEEN THE LEGS OF A METAL SHEET

FIELD OF THE INVENTION

The invention relates to an electronic angle measuring device for measuring the bending angle between the legs of a metal sheet, having a sensor element which delivers angle-equivalent signals in a contact-free manner to a signal processing device comprising a microprocessor and a memory unit which is connected to a digital display.

DESCRIPTION OF THE PRIOR ART

The measurement of the bending angle during the bending of metal sheets is of essential importance since after the bending process the workpiece springs back depending on the material, on the thickness of the metal sheet, on the rolling direction and the like. Thus, by using an effective measuring device, the bending result can be monitored still in the machine or can be corrected or improved by a manual or automatic after-bending process without the metal sheet needing to be removed from the machine. However, the integration of the known measuring devices into a bending machine requires an expensive adaptation of the bending machines by special structures.

Measuring devices based on a light cutting process are known (DE 43 12 565 C2) for the contactless measurement of the bending angle between the legs of a metal sheet to be bent in a bending machine. Furthermore however, it is also known (JP 2002-59217 A) to use measuring devices in which use is made of the circumstance that the radiation intensity of a laser beam reflected at a leg of the metal sheet and received in the emission direction is highest when the laser beam is incident perpendicularly on the metal sheet leg. For this purpose in the region of the upper tool of the bending machine, a mirror is provided which rotates about an axis parallel to the apex axis of the bending angle and is inclined with respect to this axis of rotation at 45° so that a laser beam incident on the mirror in the direction of the axis of rotation is deflected in a plane perpendicular to the axis of rotation onto the leg of the metal sheet to be bent and is reflected by the legs and specifically in the emission direction when the laser beam is perpendicular on the respective leg. The respective angle between the two legs can then be determined in a signal processing device by means of the relevant rotational position of the drive motor for the mirror. The disadvantage that the bending machine must be adapted constructively for the use of such a measuring device still persists however.

SUMMARY OF THE INVENTION

It is therefore the object of the invention to provide simple constructive conditions in order to be able to equip a bending machine even subsequently with an electronic angle measuring device for measuring the bending angle between the legs of a metal sheet without needing to make expensive modifications to the bending machine.

The invention solves the formulated object by the features of claim 1.

Since the measuring device is configured as an angle measuring device which comprises the devices required for the angle measurement, namely a sensor element which delivers angle-equivalent signals in a contactless manner to a signal processing device comprising a microprocessor and a memory unit which is connected to a digital display, which is also arranged in the angle measuring unit, this angle measuring device only needs to be fastened to the upper tool of the bending machine which does not require any expensive constructive modification of the bending machine. The requirement however is that the sensor element is suitable for emitting and receiving measurement signals in order to ensure the compact design required for a manual measuring device. This is achieved in a manner known per se whereby the sensor element scans the legs of the metal sheet with a laser beam in a plane perpendicular to the apex axis of the bending angle and only records the laser beam reflected at the legs in the emission direction, the intensity of which is highest when the emitted laser beam is incident perpendicularly on the legs of the metal sheet. The respective bending angle can be deduced and displayed by means of the integrated signal processing device from the rotational positions of the rotating mirror for emission of the laser beam for the laser beams perpendicular to the legs. However, a requirement is that a measurement access by the sensor element to the two legs of the metal sheet is possible. Since the upper tools of the bending machines are usually composed of individual stamp segments, for a measurement access to the two legs of the metal sheet to be bent it is merely necessary to leave a measurement gap free between two stamp segments and align the angle measuring device with respect to this measurement gap. Since only the alignment of the axis of rotation parallel to the apex axis of the angle to be measured is important but not the position of the axis of rotation, no special modification of the conventional upper tools is required to be able to fasten an angle measuring device according to the invention on the upper tool.

In order that no additional measures need to be taken for fastening the angle measuring device on the bending machine, in the housing rear wall the angle measuring device can have a permanent magnet for fastening to the upper tool of the bending machine, which not only creates advantageous assembly conditions but also brings with it the possibility of a simple readjustment of the angle measuring device with respect to the apex axis of the bending angle and the measurement gap.

If the angle measuring device comprises a motion sensor connected to the signal processing device, which records the lowering movement and/or the raising movement of the upper tool for triggering the measurement process, it can be operated independently of the machine controller. Due to the motion sensor the movement of the upper tool is recorded by the angle measuring device itself so that angle measurements can be performed automatically synchronously to the working cycles of the bending machine without special measures needing to be taken for this on the bending machine, for example, the provision of cabling or interfaces to the machine controller for the exchange of synchronization signals. Particularly advantageous design conditions are obtained if the motion sensor is configured as a multiaxial acceleration sensor because in this case with the aid of the multiaxial acceleration sensor, a simple alignment of the angle measuring device with respect to the apex axis of the bending angle becomes possible, which axis usually runs horizontally. The recording of the direction of gravity as a result of the acceleration signals evaluated accordingly by the signal processing device can also be used to record and display the inclination.

The recording of the gravitational acceleration by the multiaxial acceleration sensor also makes it possible to correct the signal of the acceleration sensor by the signal component based on the gravitational acceleration so that exclusively changes in the movement of the angle measuring device and therefore the upper tool are recorded. The speed and the path of the upper tool for the start and the end of the measurement process can thus be determined from the corrected offset-free acceleration values.

If the signal processing device signals when programmable tolerance limits of the angle to be measured are exceeded or fallen below, it is possible to intervene in the bending process in an advantageous manner in order to ensure the maintenance of the tolerance limits.

In order to improve the accuracy of the measured values, in particular measured values can be stored in the memory unit during the raising movement of the upper tool so that these measured values can be evaluated by the signal processing device according to mathematical methods in order to increase the measured value accuracy. By this means in particular reverberation processes can be recorded and the measured values pertaining to the reverberations can be eliminated.

If the signal processing device comprises a radio interface, no cabling is provided in order to be able to read out data of the angle measuring device and, for example, to preset the machine controller or in order to be able to access the angle measuring device in a controlling manner from outside. In this connection, it probably does not need to be particularly emphasized that batteries or rechargeable batteries can be used for the power supply in order to avoid cable connections.

BRIEF DESCRIPTION OF THE DRAWING

The inventive subject matter is shown as an example in the drawings. In the figures FIG. 1 shows a bending machine with a digital angle measuring device according to the invention in a partially cutaway schematic side view FIG. 2 shows this bending machine in a schematic vertical section and FIG. 3 shows the electronic angle measuring device according to the invention in a simplified block diagram.

DESCRIPTION OF THE PREFERRED EMBODIMENT

The bending machine shown has a lowerable and raisable upper tool 1 which cooperates with a lower tool 2 in the form of a die and is composed of stamp segments 3 arranged adjacently to one another in a row. For measurement of the bending angle between the legs 4 of a metal sheet 5 to be bent, a digital measuring device 6 is fastened to the upper tool 1, which comprises a sensor element 7 with a mirror which is rotated about an axis of rotation parallel to the apex axis of the bending angle between the two legs 4 of the metal sheet and deflects a laser beam in a plane perpendicular to the apex axis onto the two legs 4. The laser beam thereby passes through a measurement gap 8 between two stamp segments 3. Since the sensor element 7 has a receiver for the laser beam reflected in the emission direction at the legs 4 and the intensity of the reflected laser beam is highest when the laser beam is perpendicular to the legs 4, the rotational position of the mirror can be specified for the laser beams which are perpendicular to the legs 4 of the metal sheet 5, as is illustrated in FIG. 2. The respective bending angles between the two legs 4 can thus be deduced from these rotational positions of the mirror.

For this purpose according to FIG. 3, the sensor element 7 is connected to a signal processing device 9 which evaluates the measurement signals received by the sensor element 7 and outputs the measured bending angles to a display 10. This display 10 is required not only for use of the angle measuring device as a hand-held device but also, when used as a machine measuring device, allows the bending angles and other displayed data to be read off without crucially looking away from the metal sheet 5 which is located in the field of view in any case.

Since the angle measuring device 6 has a motion sensor 11 connected to the signal processing device 9, by recording the movement of the upper tool 1, the angle measurement can be synchronized with the movement of the upper tool 1 without needing to access the machine controller. However it is also possible to control the angle measuring device 6 synchronously to the bending process from outside, for example, by a connection of the angle measuring device 6 to the machine controller.

The electronic angle measuring device 6 can be used in existing bending machines without expensive modification work if a measurement access of the sensor element 7 to the two legs 4 of the metal sheet 5 is possible which can be ensured in a simple manner with the usual composition of the upper tool 1 from stamp segments 3. The angle measuring device 6 merely needs to be suitably fastened on the upper tool 1. For this purpose it is recommended to provide at least one permanent magnet 12 in the region of the housing rear wall of the angle measuring device 6.

If the motion sensor 11 is configured as a multiaxial acceleration sensor, by means of its signal for the gravitational acceleration the angle measuring device 6 can be aligned in a simple manner with respect to the horizontal apex axis of the bending angle between the two legs 4 which is predefined by the die and the stamp segments 3. In addition, it becomes possible to evaluate a measurement signal corrected with regard to the gravitational acceleration so that exclusively accelerations of the angle measuring device 6 can be used to determine the movement of the upper tool 1.

If the angle measuring device 6 has a radio interface 13, data can be transmitted outwards from the angle measuring device 6 in a cableless manner but signals can also be transmitted to the angle measuring device 6 from outside. In order to be able to set different operating modes for the angle measuring device 6, the angle measuring device can also be provided with an input 14. In order to be free from cable connections, the angle measuring device 6 should preferably be fitted with batteries or rechargeable batteries 15 for the power supply.

The invention claimed is:

1. An electronic angle measuring device for measuring a bending angle between two legs of a metal sheet, said device comprising:
   a sensor element that delivers angle-equivalent signals in a contact-free manner to a signal processing device, which has a microprocessor and a memory unit and is connected to a digital display,
   wherein the sensor element deflects a laser beam through a rotating mirror onto the two legs of the metal sheet and forms a measured value from a reflection beam received in an emission direction, and
   wherein the signal processing device with the microprocessor and the memory unit as well as the digital display form an angle measuring device;

wherein said angle measuring device is fastened to an upper tool of a bending machine and is configured to be used as a manual measuring device; and wherein the tool has a gap therein and the laser passes through said gap.

2. The electronic angle measuring device according to claim 1, wherein in a housing rear wall the angle measuring device has a permanent magnet fastening to the upper tool of the bending machine.

3. The electronic angle measuring device according to claim 1, wherein the signal processing device signals that programmable tolerance limits of the angle to be measured have been exceeded or fallen below.

4. The electronic angle measuring device according to claim 1, wherein the signal processing device comprises a radio interface.

5. The electronic angle measuring device according to claim 1, wherein the angle measuring device comprises a motion sensor connected to the signal processing device, wherein said signal processing device records a lowering movement and/or a raising movement of the upper tool and triggers a measurement process.

6. The electronic angle measuring device according to claim 5, wherein the motion sensor is configured as a multiaxial acceleration sensor.

7. The electronic angle measuring device according to claim 5, wherein the signal processing device evaluates measured values stored in the memory unit during the lowering and raising movement of the upper tool so as to increase accuracy of the measured values according to mathematical methods.

8. An electronic angle measuring device for measuring a bending angle between two legs of a metal sheet, said device comprising:

a sensor element that delivers angle-equivalent signals in a contact-free manner to a signal processing device, which has a microprocessor and a memory unit and is connected to a digital display, wherein the sensor element deflects a laser beam through a rotating mirror onto the two legs of the metal sheet and forms a measured value from a reflection beam received in an emission direction, and wherein the signal processing device with the microprocessor and the memory unit as well as the digital display form an angle measuring device adapted to be fastened to an upper tool of a bending machine and that is configured to be used as a manual measuring device, and wherein the angle measuring device comprises a motion sensor connected to the signal processing device, wherein said signal processing device records a lowering movement and/or a raising movement of the upper tool and triggers a measurement process.

9. The electronic angle measuring device according to claim 8, wherein the motion sensor is configured as a multiaxial acceleration sensor.

10. The electronic angle measuring device according to claim 8, wherein the signal processing device evaluates measured values stored in the memory unit during the lowering and raising movement of the upper tool so as to increase accuracy of the measured values according to mathematical methods.

* * * * *